United States Patent [19]

Shih

[11] Patent Number: 4,871,314

[45] Date of Patent: Oct. 3, 1989

[54] TOY BALANCE CONCEPT-DEVELOPING DEVICE

[76] Inventor: Hsu-Shen Shih, No. 75, Lane 101, Nan Yuan St., Tainan, Taiwan

[21] Appl. No.: 294,300

[22] Filed: Jan. 9, 1989

[51] Int. Cl.⁴ .............................................. G09B 19/02
[52] U.S. Cl. ..................................................... 434/194
[58] Field of Search ........................................ 434/194

[56] References Cited

U.S. PATENT DOCUMENTS

| | | | |
|---|---|---|---|
| 2,402,892 | 6/1946 | Hubble | 434/194 |
| 3,486,244 | 12/1969 | Horn | 434/194 |
| 4,218,835 | 8/1980 | Iseki | 434/194 |
| 4,240,213 | 12/1980 | Lutin | 434/194 |

FOREIGN PATENT DOCUMENTS 650205  2/1951  United Kingdom ................ 434/194

Primary Examiner—William H. Grieb
Attorney, Agent, or Firm—Keaty & Keaty

[57] ABSTRACT

A toy balance concept-developing device for helping children to develop a concept of balance, including a housing, a beam, a positioning means, a model and a number of plastic weights. Owing to the weight difference between the weight on two distal end of the beam, the beam is rotatable to activate the pointer to indicate if the beam is in balance.

1 Claim, 6 Drawing Sheets

TOY BALANCE CONCEPT-DEVELOPING DEVICE

BACKGROUND OF THE INVENTION

The present invention relates to a toy, more particularly to such toy having both balance concept-development and entertainment functions.

Nowadays, a variety of toys are in market. Usually, they can be divided into two categories, dynamic and static toys, such as remote control motor toys (dynamic toys) and dolls (static toys). No matter what kind of toys they are, one essential quality that they all must have is to attract children. However, conventional toys provide entertainment for the children but often lack concept developing function.

SUMMARY OF THE INVENTION

In order to mitigate and/or obviate the above-mentioned drawbacks in the manner set forth in the detailed description of the preferred embodiment, it is an objective of the present invention to provide a toy which helps children to develop simple calculation and balance concepts.

BRIEF DESCRIPTION OF THE DRAWING

The foregoing and other objectives, features, and advantages of the present invention will be apparent from the following detailed description of the preferred embodiments which make reference to the several figures of the drawing.

DETAILED DESCRIPTION OF THE PREFERRED EMBODIMENT

Figure 1:
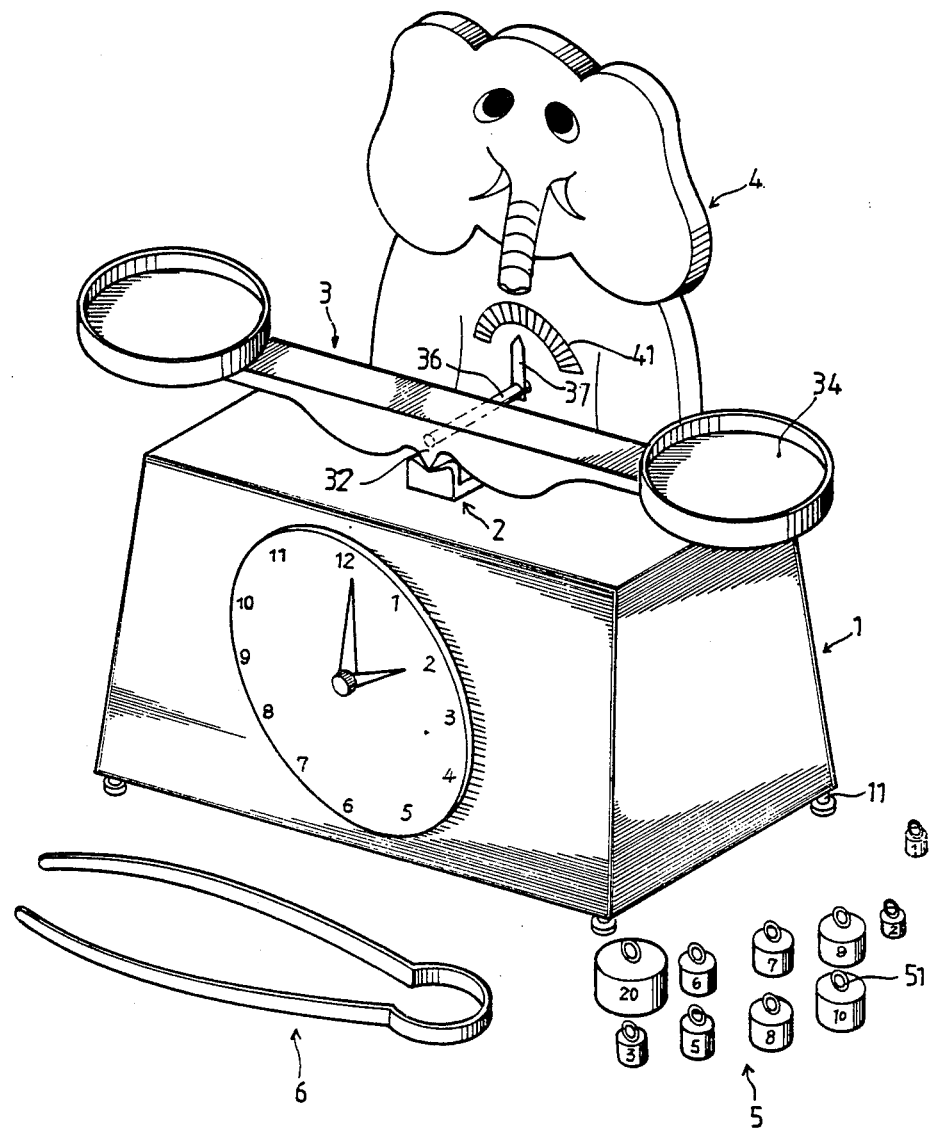
FIG. 1 is a perspective view of a toy balance concept-developing device in accordance with the present invention.

With reference to FIG. 1, it can be seen that a toy balance concept-developing device in accordance with the present invention comprises a housing 1, a positioning means 2, a beam 3, a model 4, a plurality of plastic weights 5 and a clip 6.

Figure 2:
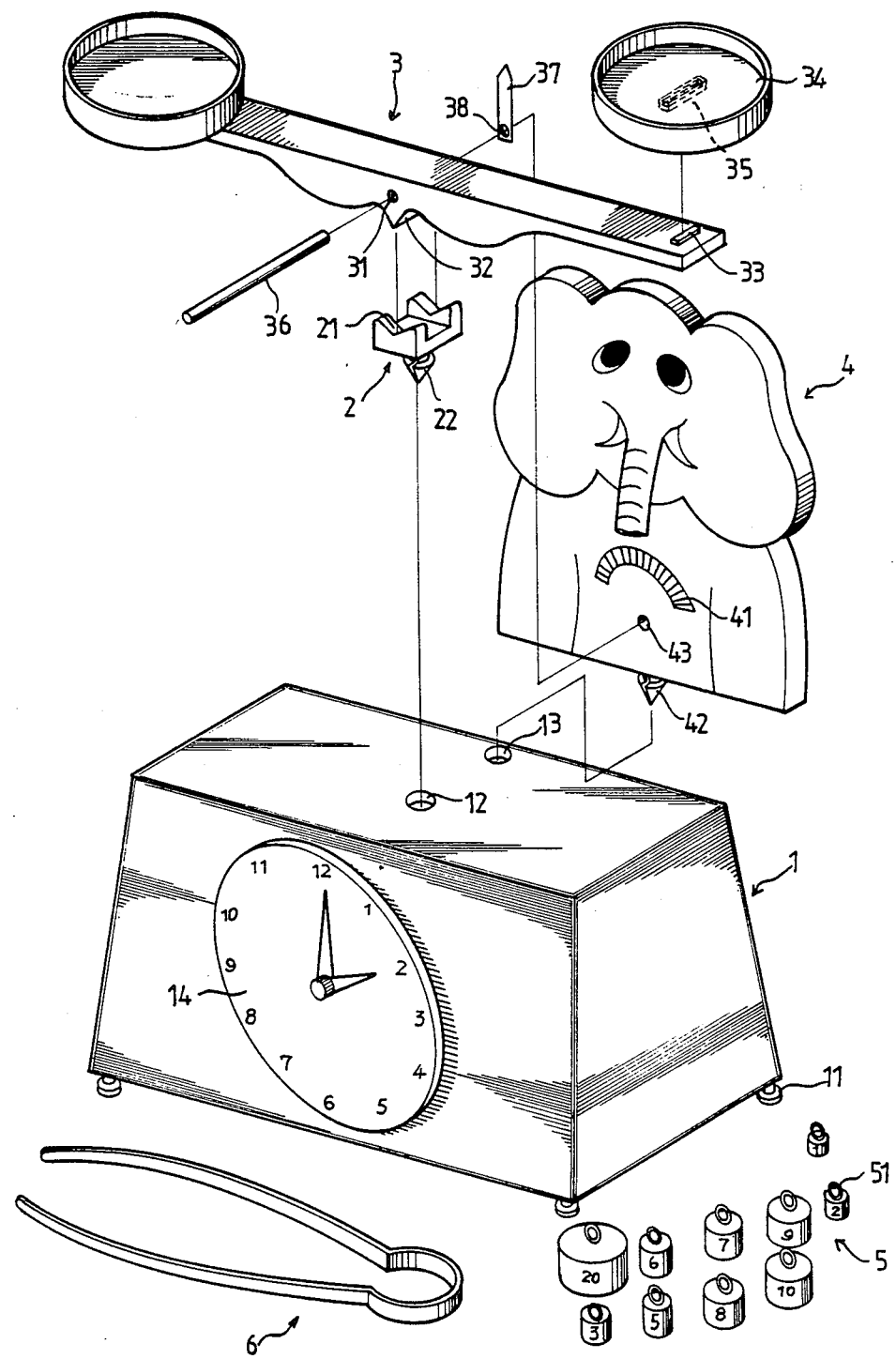
FIG. 2 is an exploded view of a toy balance concept-developing device in accordance with the present invention.

Referring to FIG. 2, the housing 1 has four support means 11 arranged thereunder so as to enable the housing 1 to stand firmly. Also, the housing 1 has two apertures 12, 13 located thereon and an ornamental means 14 on the front side thereof.

Figure 3:
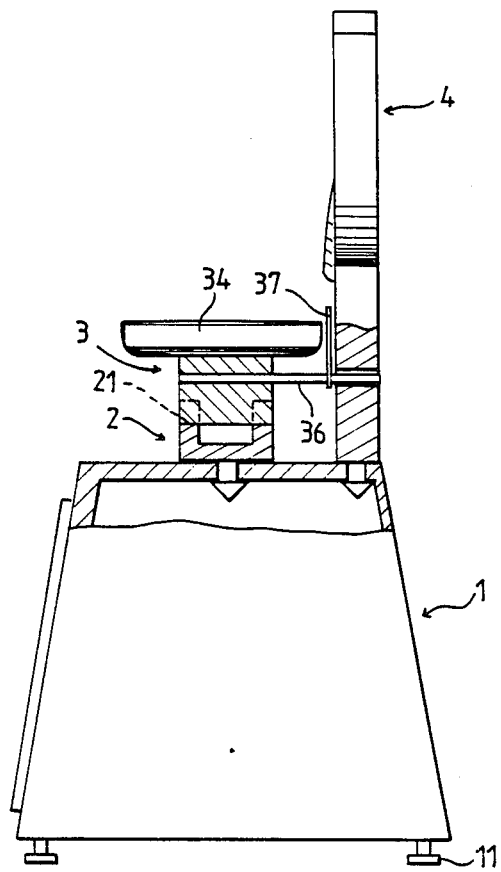
FIG. 3 is a partially cutaway side view of a toy balance concept-developing device in accordance with the present invention, showing the U-shaped positioning means.

The positioning means 2, which is substantially U-shaped, has a first conical member 22 secured thereunder for engaging with aperture 12 on the housing 1. A notch 21 is formed on each side of the U-shaped positioning means 2 to support the beam 3 (shown in FIG. 3).

The beam 3 has a tip means 32 formed on the bottom middle portion thereof to touch the notches 21 at a point so that the beam 3 is rotatable if a weight difference occurs. A bore 31 is transversely formed on the beam 3 and above the tip means 32 for receiving a spindle 36. A disk-like container 34 is attached to each distal end of the beam 3 for loading the weights 3. Respective protrusions 33 protruding from each distal end of the beam 3 is provided to match a recess 35 formed under each container 34 so that the containers 34 can be secured on the beam 3. A pointer 37 has a hole 38 formed at the bottom end thereof. Furthermore, the outer diameter of the spindle 36 is slightly less than the inner diameters of the bore 31 and the hole 38 so that the spindle 36 is force fitted in the bore 31 and the hole 38. That is to say, when there is an imbalance of weights and the beam 3 is rotating, then the beam 3, the spindle 36 and the pointer 38 rotate in synchrony.

The model 4 has a scale 41 thereon and below the scale 41 a cavity 43 is aligned with the bore 31 thereby receiving the spindle 36 therein. One division of the scale 41 is a unit. A second conical member 42 is attached under the model 4 to engage with the aperture 13 so as to be disposed on the housing 1. The plastic weights 5, each having a lug 51 connected thereon to facilitate picking up of the weights 5 by children with the clip 6, have various weights. The weight of each weight 5 is in the ratio to the scale. Furthermore, if the weight 5 enables the pointer 37 to move one division, it will be marked '1' on the surface. The weights 5 could be marked '2' on the surface as the weights 5 marked '2' are twice the weight of that marked '1'. In the manner as stated above, the weights 5 also can be marked '3', '4', and so on up to '9' and '10', '20', and so on up to '90', if necessary. Also, any number or combination of weights 5 may be used.

Figure 4:
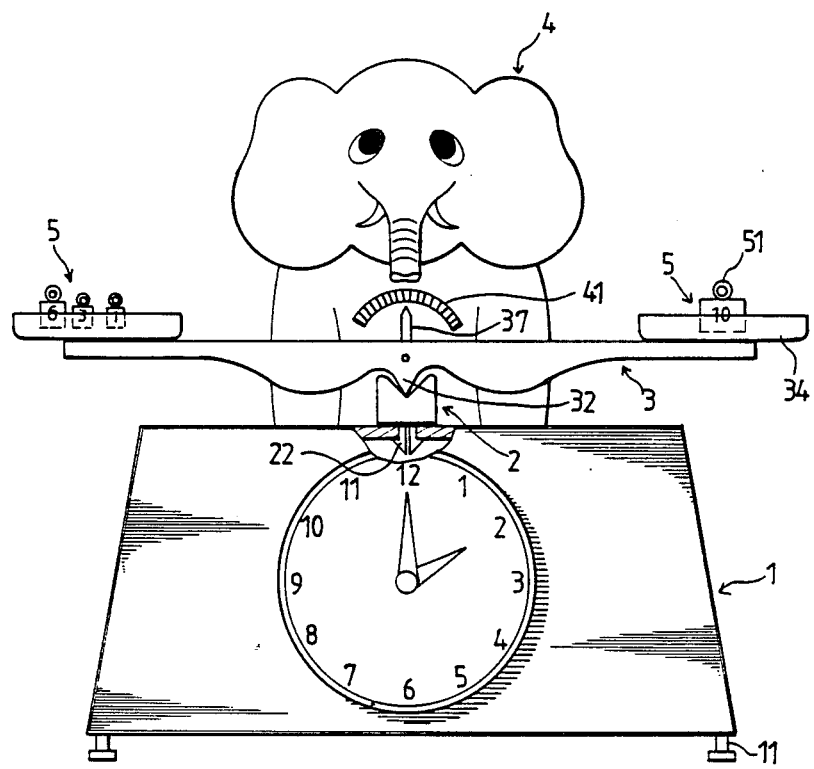
FIG. 4 is a plan view of a toy balance concept-developing device in accordance with the present invention, in which the total weight on the two distal ends of the beam are equal.
Figure 5:
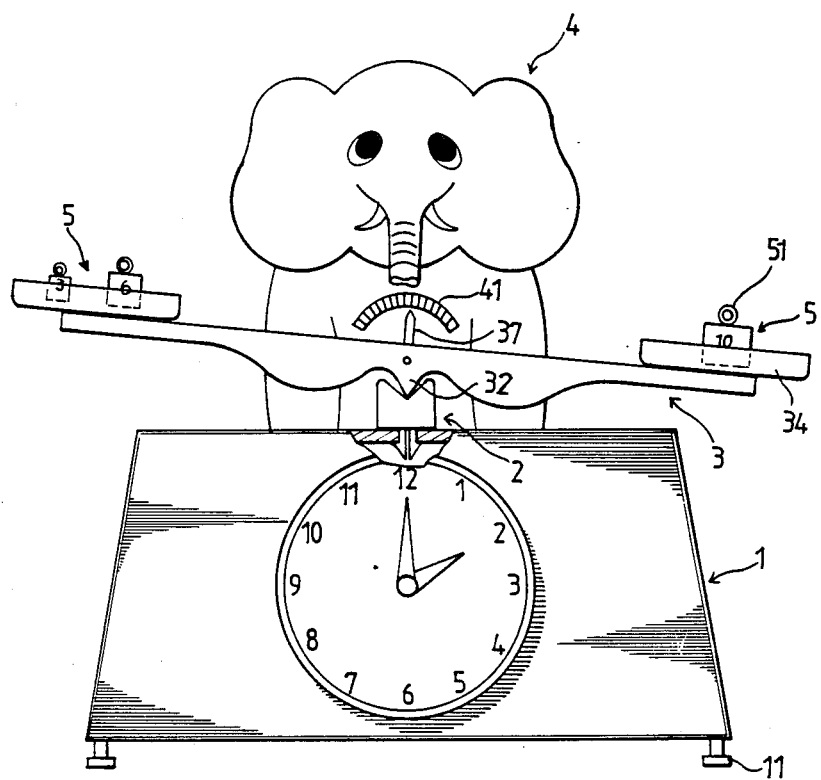
FIG. 5 is a working plan view of a toy balance concept-developing device in accordance with the present invention, showing a weight difference between the two distal ends of the beam.
Figure 6:
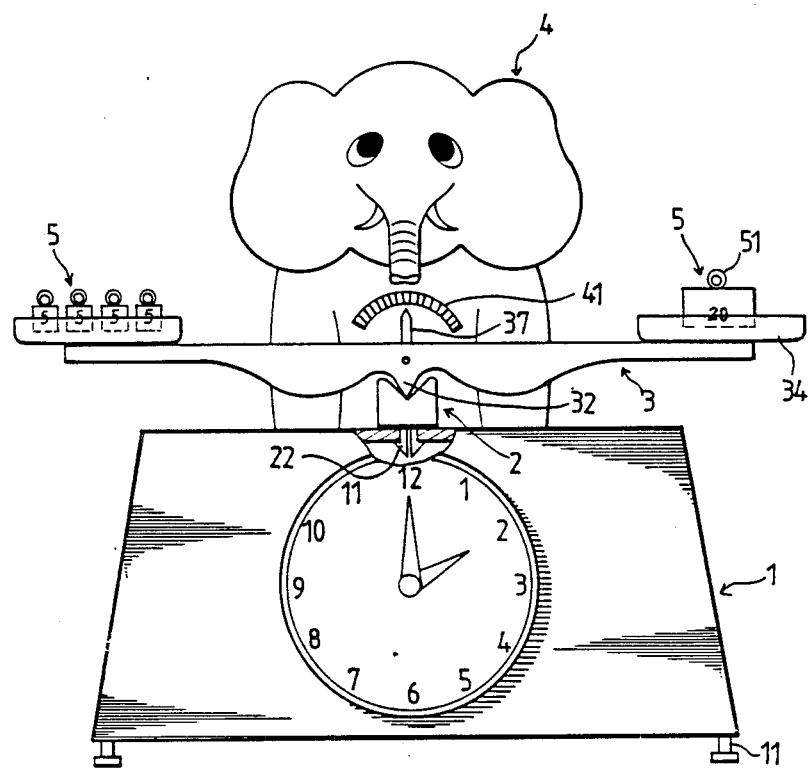
FIG. 6 is a further working plan view of a toy balance concept-developing device in accordance with the present invention, in which the total weight on each the two distal beam ends of the beam are equal.

Now referring to FIG. 4, before playing with this toy, the children should be taught that when the pointer 37 is vertical as the total weights on each container 34 are equal, the beam 3 is horizontal. As the weights 5 marked '6', '3' and '1' are put on left-hand container 34, the pointer 37 will move ten divisions on the scale 41, then children will realize that six plus three plus one are ten. Moreover, children should select a weight marked '10' to put it on the other container 34. Finally, the beam 3 returns to a balanced state. If the children get the wrong answer, for example, three plus six is ten, then the weight marked '10' is selected. Finally, the beam 3 is tilted, as shown in FIG. 5. Additionally if four weights marked '5' are on one of the container 34, the weight marked '20' should be selected to make the beam 3 in balance. That is to say, children can learn four times five is twenty. So such a toy helps children to learn simple calculations and develop their concept of balance.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A toy balance concept-developing device for helping children to develop a concept of balance, comprising a housing, a positioning means, a beam, a model, a plurality of weights and a clip, characterized in that:

said housing has first and second apertures located thereon and an ornamental means on the front side thereof;

said positioning means is substantially U-shaped and has a first conical member secured thereunder for engaging with said first aperture, a notch being formed on each side of said positioning means to support said beam;

said beam has a tip means formed on the middle bottom thereof so as to contact said notches at a point, a transverse bore being formed on said beam and being aligned with said tip means for receiving a spindle, a container being attached to each distal end of said beam by fitting a protrusion protruding from said each distal end of said beam to a recess formed on each said container thereunder, and a pointer which has a hole at a bottom end thereof to receive said spindle;

said model has a scale thereon, a cavity being below said scale and aligned with said bore; said cavity receiving said spindle therein, a second conical member being attached under said model to engage with said second aperture;

said weights each having a lug connected thereon to facilitate picking up thereof by children with said clip; each said weight being different in weight.

* * * * *